United States Patent [19]

Philibert

[11] 3,891,294
[45] June 24, 1975

[54] CORD GRIP CONNECTOR

[75] Inventor: Robert A. Philibert, Burlington, Conn.

[73] Assignee: General Signal Corporation, Rochester, N.Y.

[22] Filed: Jan. 9, 1974

[21] Appl. No.: 431,827

[52] U.S. Cl.................... 339/103 R; 24/20; 174/65; 285/342; 339/107; 403/309
[51] Int. Cl........................................... H01r 13/58
[58] Field of Search............ 339/103 R, 103 C, 101, 339/107; 24/20 R, 20 LS; 174/65 R, 65 SS; 285/354, 342; 403/309, 313, 344, 371

[56] References Cited
UNITED STATES PATENTS

| | | | |
|---|---|---|---|
| 3,324,448 | 6/1967 | Von Holtz...................... | 339/103 C |
| 3,667,783 | 6/1972 | Sotolongo.................... | 174/65 SS X |

Primary Examiner—Roy Lake
Assistant Examiner—DeWalden W. Jones
Attorney, Agent, or Firm—Milton E. Kleinman; John Ohlandt

[57] ABSTRACT

A cord or cable gripping or clamping device adapted to be used with a fitting such as a connector which is normally used to connect a cable to a panel, enclosure or the like. The clamping device is designed in two parts and is adapted to fit within the locking collar that is used at the outer end of the connector even in the event that the locking collar has already been engaged with the connector body. The clamping device is provided with suitably designed flanges that can be inserted through an aperture and into the interior of the locking collar from the outside. A pair of ears, for each of the clamping device parts, extend radially outwardly from either side thereof, such ears lying in a plane which passes near the longitudinal axis of the clamping device. Each of such ears is provided with a screw-receiving hole, and a pair of screws is used to bring the two parts of the clamping device together, so as to clamp or grip the cable or cord. When installed, the aforesaid flanges on the clamping device parts prevent pull-out of the cable.

2 Claims, 2 Drawing Figures

PATENTED JUN 24 1975 3,891,294

CORD GRIP CONNECTOR

BACKGROUND, OBJECTS AND SUMMARY OF THE INVENTION

The present invention pertains to electrical equipment, more particularly to electrical fittings or connectors designed to provide strain relief in connecting electrical cable or cord to a panel, enclosure or the like.

Electrical fittings have been known are designed for the purpose of making connection to the aforesaid type of equipment and, while doing so, providing reasonable strain relief, that is to say, to prevent transmission of any substantial strain placed on the cable to the internal connections of the individual conductors making up the cable. As a result, even though the cable be strained or pulled to some extent, this will not cause breaking of the interconnections within the panel or enclosure. Rather, the force will typically be resisted by means of a gripping device such as a grommet which is retained within the connector and serves to clamp or grip the individual cable.

In the aforesaid prior art, when connectors are to be placed in an installation, a locking collar or gland nut is utilized, such locking collar being suitably provided with threads such that these engage with corresponding threads at the outer end of the connector body. Accordingly, when the locking collar is tightened, an inwardly extending flange integrally formed thereon bears against the aforesaid grommet, the grommet generally being led by a suitably chamfered surface at the interior of the fitting so as to bring about firm gripping of the cable. Despite the efficacy for certain applications in the use of a grommet which is engaged by the locking collar or gland nut, as described above, it has been found that such an arrangement is not capable of withstanding pull-out forces which are greater than 50 pounds.

Accordingly, it is a primary object of the present invention to overcome the limitation experienced with prior art fittings and to provide a connector that is capable of withstanding severe pull-out forces.

Another object is to provide a clamping or gripping device that can be simply installed, even subsequent to the placing of the locking collar or gland nut in position to be firmly engaged with and attached to the connector. In other words, even though the clamping device has the capability of being installed from the outside of the locking collar, it will, when tightened down on the cable, provide complete resistance to pull-out forces, because of the unique arrangement whereby the flanges on the gripping or clamping device will abut and engage with the inwardly-directed flange on the locking collar.

The above objects are fullfilled by a basic feature of the present invention which resides in the provision of a gripping device comprising two parts or body members which are essentially semi-annular in configuration. Each of these parts is provided at its inner end with a flange adapted to engage with the inner surface of the inwardly-directed flange on the locking collar of the connector. Each of the body member flanges extends circumferentially and radially outwardly with respect to the body member, the outer edges thereof extending arcuately, for the most part, in substantially concentric conformity with the curvature of the semi-annular body members or parts. However, these flanges do not extend fully circumferentially but are truncated or delimited such that their ends have straight edges, approximately in a plane in which the ends of the arcuate portions of the clamping parts also lie. Accordingly, the length of a line drawn between the two straight edges and perpendicular to both, is less than the diameter of the circular opening in the locking collar. By this particular construction, it becomes a simple matter to insert the clamping device by tilting the longitudinal axes of the two parts of the device so that the circumferential flanges at the inner ends are able to clear the circular opening in the locking collar. Despite the ease of insertion, however, firm engagement of the aforesaid circumferential flanges with the locking collar is assured when the clamping device is clamped down on the cable.

Other objects, features and advantages of the present invention will be appreciated by reference to the detailed description which follows when taken in conjunction with the appended drawing.

PREFERRED EMBODIMENT OF THE INVENTION

Figure 1:
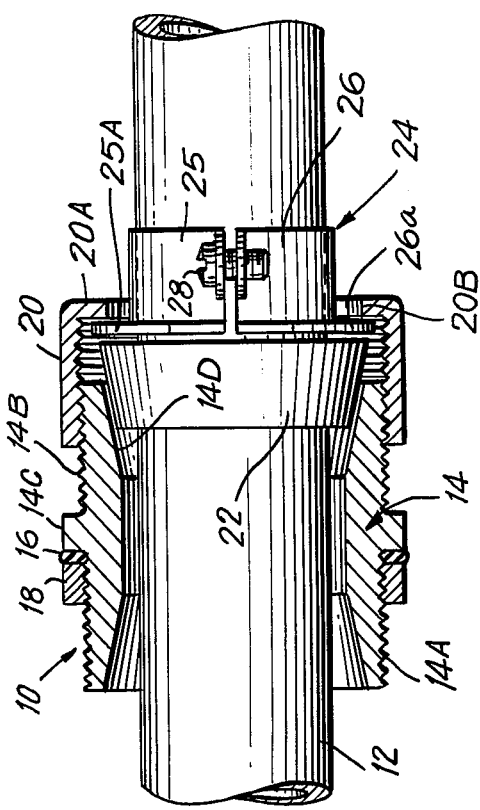
FIG. 1 is a cross-sectional view of the cable grip connector of the present invention.

Referring now to the figures of the drawing, there will be seen a preferred embodiment of the cable grip connector of the present invention. The connector is generally designated 10 and is adapted for the purpose of securing or connecting a cable 12 to an enclosure, or the like, so that the individual conductors within the cable 12 can be appropriately connected to terminals within such enclosure.

The connector 10 comprises a body or portion 14 which is suitably threaded both at its inner end 14A and its outer end 14B. The connector 10 is also provided with a hexagonal flange 14C which bears against the enclosure surface or the like. A gasket 16 is utilized to seal the fitting or connector against the enclosure at one side and a lock nut 18 at the other side, thereby securing the connector body 14 to the enclosure.

A gland nut or locking collar 20 is disposed at the outer end of the connector body 14, such locking collar being provided with internal threads to engage with the corresponding threads at end 14B on the connector body. The outer end of the locking collar 20 has a radially inwardly directed flange member 20A. A grommet 22 is provided at the interior of the fitting, such grommet having a circumference which decreases from the outer to the inner end thereof, whereby the grommet is suitably adapted to engage with the chamfered internal surface 14D of the connector body.

Accordingly, as the locking collar 20 is tightened on to the connector body by engagement with the threads 14B thereon, the flange 20A bears against the outer end of the grommet 22 and forces it within the connector body, resulting thereby in forming a tight grip on the cable 12. However, as already explained heretofore, this gripping action is not sufficient to withstand very high pullout forces that are quite frequently encountered.

In accordance with the present invention a clamping device generally designated 24, preferably constituted of steel and cadmium plated, is utilized at the outer end of the connector.

The clamping device 24 consists of two parts or body members, 25 and 26, which are semi-annular in shape, having arcuate portions 25A and 26A adapted to fit around and conform closely to the curvature of the cable 12 with which they are expected to be used for the purpose of clamping down on such cable. A radially outwardly, and circumferentially extending flange is provided at the inner end of each of the semi-annular parts 25 and 26. These circumferential flanges are denoted 25B and 26B and they conform, with respect to their outer edges, substantially to the curvature of the respective arcuate portions 25A and 26A; however, they terminate in ends 25C and 26C having straight-line edges.

It will be noted that a pair of radially outwardly and axially, directed ears 25D (only one of which is seen) extend from either side of the semi-annular or semi-cylindrical part 25 and, correspondingly, a pair of ears 26D extend in similar fashion from the sides of the other part, that is, the semi-annular part 26.

Figure 2:
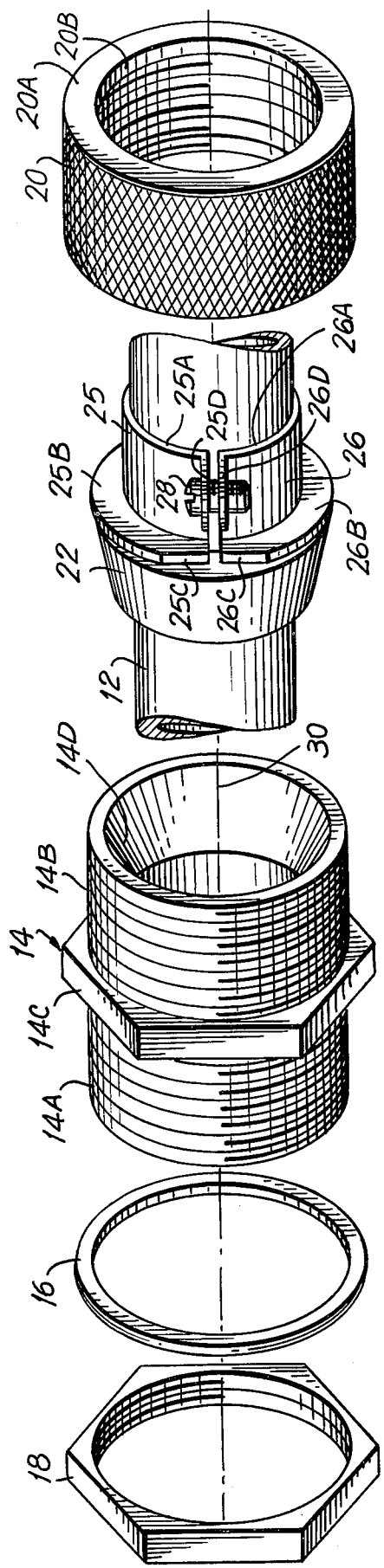
FIG. 2 is an exploded view of the connector.

It will be seen, especially by reference to FIG. 2, that the aforesaid ends 25C and 26C of the flanges 25B and 26B at either side of the device 24 lie in a plane which is substantially perpendicular to respective confronting flanges 25D and 26D. Each of the pair of ears 25D of the clamping part 25 is provided with a hole through which each of a pair of screws 28 can pass; likewise the other part, that is, part 26 is provided with appropriately corresponding screw-receiving holes which are suitably threaded.

From the preceding it can be seen that when the time comes to install the independent clamping device 24, it can be very easily put into position, even though the locking collar has already been placed into engagement with the connector body 14. Thus, when each of the semi-cylindrical or semi-annular parts 25 and 26 is appropriately maneuvered, such as by tilting of the parts from the horizontal axis 30, the inner ends, having the flanges 25B and 26B, can clear the opening 20B in the locking collar 20 because of the truncated ends 25C and 26C. The clamping device parts can then be held in confronting relationship around the cable 12, while the screws 28 are tightened until the cable is firmly clamped. The flanges 25A and 26A will be held between the grommet 22 and the flange 20A of the locking collar 20 and will operate to prevent pull-out of the cable.

While there has been shown and described what is considered at present to be the preferred embodiment of the present invention, it will be appreciated by those skilled in the art that modifications of such embodiment may be made. IT is therefore desired that the invention not be limited to this embodiment, and it is intended to cover in the appended claims all such modifications as fall within the true spirit and scope of the invention.

What is claimed is:

1. An electrical fitting adapted to grip a cable or cord, comprising:
    a connector body having threads at both of its ends;
    a locking collar having threads adapted to engage with threads at the outer end of said connector body, said locking collar being provided with a radially inwardly directed flange and an opening in said connector body defined by said flange;
    a clamping device adapted to be inserted within the interior of said locking collar from the outside, said clamping device being formed in two parts, semi-annular in shape, each of said parts having a radially outwardly extending flange adapted to engage the inner surface of the flange on said locking collar;
    said clamping device being so shaped as to fit around a cable or the like and being provided with a pair of outstanding ears on each of the semi-annular parts, said parts being held in spaced relationship and being brought together so as to clamp said cable, each of the flanges on said clamping parts terminating in straight edge portions, the perpendicular distance between said edge portions at opposite ends of each of the respective flanges being less than said opening in the locking collar.

2. A device as defined in claim 1, in which the means for bringing together the parts of the clamping device include screws fitted within apertures provided in the aforesaid ears at either side of said clamping device.

* * * * *